United States Patent [19]

Drawert et al.

[11] 4,150,002

[45] Apr. 17, 1979

[54] POLYAMIDE MELT ADHESIVES

[75] Inventors: Manfred Drawert, Froendenberg-Strickherdicke; Eugen Griebsch, Nordkirchen; Wolfgang Imoehl, Unna-Koenigsborn, all of Fed. Rep. of Germany

[73] Assignee: Schering Aktiengesellschaft, Berlin and Bergkamen, Fed. Rep. of Germany

[21] Appl. No.: 851,801

[22] Filed: Nov. 15, 1977

[30] Foreign Application Priority Data

Dec. 23, 1976 [DE] Fed. Rep. of Germany ....... 2658370
Dec. 30, 1976 [DE] Fed. Rep. of Germany ....... 2659463
Dec. 30, 1976 [DE] Fed. Rep. of Germany ....... 2659464

[51] Int. Cl.² ............................................. C08L 77/08
[52] U.S. Cl. ................................. 260/18 N; 260/22 D
[58] Field of Search ......... 260/18 N, 22 D, 404.5 PA

[56] References Cited

U.S. PATENT DOCUMENTS

| | | | |
|---|---|---|---|
| 3,357,935 | 12/1967 | Fulmer et al. | 260/18 N |
| 3,852,226 | 12/1974 | Sprauer | 260/18 N |
| 3,900,436 | 8/1975 | Drawert et al. | 260/18 N |
| 4,045,389 | 8/1977 | Drawert et al. | 156/331 |
| 4,051,087 | 9/1977 | Scoggins et al. | 260/18 N |

FOREIGN PATENT DOCUMENTS 1000216  8/1965  United Kingdom ................. 260/18 N

*Primary Examiner*—M. J. Welsh
*Attorney, Agent, or Firm*—Curtis, Morris & Safford

[57] ABSTRACT

Polyamides and polyesteramides having melt viscosities from 25 to 600 Pa.s at 220° C. and useful as melt adhesives for textiles are disclosed, which materials are condensation products formed between (a) a dimerized fatty acid component containing at least 70 percent of dimeric acid; (b) a $C_6$–$C_{13}$ aliphatic straight-chain codicarboxylic acid; (c) a $C_6$–$C_{12}$ aliphatic straight-chain diprimary diamine; and (d) caprolactam and/or ε-aminocaproic acid; the polyesteramides additionally contain a further component (e) which is caprolactone and/or ε-hydroxycaproic acid.

6 Claims, No Drawings

POLYAMIDE MELT ADHESIVES

The present invention relates to melt adhesives comprising polyamides and polyesteramides, which adhesives are particularly suitable for adhering textiles to each other or to other materials.

The adhesive bonds obtained with the melt adhesives heretofore known in the art and which comprise dimeric fatty acids or caprolactam have a property profile and scope of use which do not yet satisfactorily fulfill practical requirements.

Accordingly, the present invention is directed to melt adhesives comprising polyamides having melt viscosities (measured at 220° C.) of 25 to 600 Pa·s (Pascal-seconds, where 1 Pa·s=10 poises), for the adhesion of textiles said polyamides comprising (a) (1) dimerized fatty acids having a content of dimeric fatty acid from 70 to 100 percent by weight and optionally comprising
  (2) monocarboxylic acids as viscosity regulators (chain breakers),
wherein up to 50 equivalent percent of the total carboxyl groups of the mixture (a) (1) and (2) can derive from monocarboxylic acids, and said polyamides further comprising
(b) one or more aliphatic straight-chain co-dicarboxylic acids having from 6 to 13 carbon atoms,
wherein the ratio of carboxyl groups from components (a) (1) and (2) to carboxyl groups from component (b) is from 0.05:1 to 5:1, said polyamide further comprising an amount substantially equivalent to the acids mentioned under (a) and (b) above of
(c) an aliphatic straight-chain diprimary diamine having from 6 to 12 carbon atoms, and
(d) caprolactam and/or ε-aminocaproic acid, wherein from 0.5 to 1.5 moles of caprolactam and/or ε-aminocaproic acid are employed per mole of carboxyl groups of the acids mentioned under (a) and (b) above.

In preparing the polyamides, the dimerized fatty acid, component (a), is reacted with all or a part of the caprolactam and/or of the ε-aminocaproic acid (component d) in a first stage. This product is then reacted in a second stage with the further components.

The present invention is also directed to polyesteramides having melt viscosities (measured at 220° C.) of 25 to 600 Pa·s, for the adhesion of textiles, said polyesteramides comprising (a) (1) dimerized fatty acids having a content of dimeric fatty acid from 70 to 100 percent by weight and optionally comprising
  (2) monocarboxylic acids as viscosity regulators (chain breakers),
wherein up to 50 equivalent percent of the total carboxyl groups of the mixture (a) (1) and (2) can derive from monocarboxylic acids, and said polyesteramides further comprising
(b) one or more aliphatic straight-chain co-dicarboxylic acids having from 6 to 13 carbon atoms,
wherein the ratio of carboxyl groups from component (a) (1) and (2) to carboxyl groups from component (b) is from 0.05:1 to 5:1, said polyesteramides further comprising an amount, substantially equivalent to the acids mentioned under (a) and (b) above of
(c) an aliphatic straight-chain diprimary diamine having from 6 to 12 carbon atoms, and
(d) caprolactam and/or ε-aminocaproic acid,
wherein from 0.5 to 2.5 moles of caprolactam and/or ε-aminocaproic acid are employed per mole of carboxyl groups of the acids mentioned under (a) and (b) above, and
(e) caprolactone and/or ε-hydroxycaproic acid,
wherein from 0.05 to 1.0 mole of caprolactone and/or ε-hydroxycaproic acid are employed per mole of the caprolactam or of the ε-aminocaproic acid mentioned above under (d).

In preparing the polyesteramides, the dimerized fatty acid (component a) may if desired, be reacted with all or part of the caprolactam and/or of the ε-aminocaproic acid (component d) in a first stage. This product may then be reacted in a second stage with the remaining components.

Preferred polyamides and polyesteramides are those in which sebacic acid is the co-dicarboxylic acid according to (b), hexamethylene diamine is the diamino component according to (c), in which the ratio of the carboxylic acids according to (a) to the carboxylic acids according to (b) is from 0.1:1 to 3:1, in which, for the polyamides, 0.8 to 1.2 moles of caprolactam and/or ε-amino-caproic acid are employed per mole of carboxyl groups of the acids (a) and (b), and in which, for the polyesteramides, 0.8 to 2 moles of caprolactam and/or ε-aminocaproic acid are employed per mole of carboxylgroups of the acids mentioned under (a) and (b), and further in which from 0.1 to 0.5 mole of caprolactone and/or ε-hydroxycaproic acids are employed per mole of caprolactam and/or ε-aminocaproic acid.

For the preparation of the polyesteramides of the present invention, a dimerized fatty acid according to (a) is preferred in which the content of dimeric fatty acid is more than 90 percent by weight.

The melt adhesives according to the invention, which comprise the sufficiently available fatty acids, caprolactam or ε-aminocaproic acid, caprolactone or ε-hydroxycaproic acid, diamines, and co-dicarboxylic acids, show good resistance to halogenated hydrocarbons and, simultaneously, also to alkali washing baths at 60° C. and, in part, also at 95° C. This resistance expresses itself by (1) very good initial resistance to tearing, i.e. the resistance values before stressing by a washing or cleaning process, and by
(2) very high wet resistance to tearing, i.e. the resistance values after cleaning while the materials are in a still-moist condition, and by
(3) outstanding values of the resistance to tearing after drying, which values are almost attained again after many washing or cleaning cycles.

By using distilled dimeric fatty acid, melt adhesives having improved color numbers are obtained. On the other hand, the use of commercially available technical grade polymerized fatty acid for the preparation of melt adhesives is possible for particular purposes. When technical dimeric fatty acid is employed, it should only be noted that the content of trimeric fatty acid should not exceed a maximum limit of about 35 percent by weight, which is the maximum content generally found in commercial dimerized fatty acids. If the trimer content is too high, the final polyamide or polyesteramide product may have a melt viscosity outside the range specified herein, in which case monomeric fatty acids can be added to the dimerized acid to compensate for the high trimer content. The amounts of monomeric acids can be readily determined by routine orientation tests well within the ordinary skill of one skilled in the art.

The term "dimerized fatty acid" refers generally to polymerized acids which are obtained from "fatty acids." The term "fatty acids" in turn encompasses unsaturated natural and synthetic monobasic aliphatic acids having from 12 to 22 carbon atoms, preferably 18 carbon atoms. The fatty acids can be polymerized according to known methods (cf. German Offenlegungsschrift Nos. 1,443,938 and 1,443,968 and German patents Nos. 1,280,852 and 2,118,702).

Polymeric fatty acids typically available in commerce have the following approximate compositions:
monomeric acids 5–15 percent by weight
dimeric acids 60–80 percent by weight
trimeric acids 10–35 percent by weight.

The content of dimeric acid can be raised up to 100 percent by weight through generally known distillation techniques.

For the polyamides and polyesteramides according to the present invention, dimerized fatty acids having a content of more than 90 percent by weight of dimeric fatty acids and small amounts of trimeric fatty acids (2 to 6 weight percent) and of monomeric fatty acids (0 to 1.5 weight percent) are preferably used, as are generally obtainable commercially. It is also possible to employ the dimerized fatty acids in their hydrogenated form.

The polyamides and polyesteramides according to the present invention lie in a definite melt viscosity region which reflects a certain molecular weight range.

The adjustment of the melt viscosity can take place in a known manner by interrupting the reaction at a desired degree of polymerization or by working with non-equivalent amounts of carboxylic acids or amines. Because of certain disadvantages of these methods, the use of monofunctional compounds or of compounds which act monofunctionally (amines or carboxylic acids) as chain breakers is preferred. For this purpose, monocarboxylic acids have proved particularly advantageous.

Whatever content of monocarboxylic acid is present in the polymerized fatty acid to be used according to the present invention can be increased up to 50 equivalent percent by the addition of monocarboxylic acids thereto, said percentage being based on the total carboxy groups present in the mixture of polymeric fatty acid and monocarboxylic acid. If the amount of the required chain breaker (viscosity regulator), in this case the monocarboxylic acid, is high, then high-molecular weight monocarboxylic acids such as oleic acid, stearic acid, linoleic acid, or linolenic acid, or mixtures thereof such as tall oil fatty acid or soya oil fatty acid, or other hydrophobic monocarboxylic acids are added.

Adipic acid, azelaic acid, sebacic acid, decamethylene dicarboxylic acid and brassylic acid can be mentioned as examples of the straight-chain aliphatic co-dicarboxylic acids having 6–13 carbon atoms which are to be used according to the present invention. These dicarboxylic acids can be employed alone or in mixtures with each other.

Instead of the carboxylic acids, their esters with lower alcohols may optionally be employed. In this case, it is recommended, particularly when the ester portion is large, that the caprolactam polymerization be started by the addition of water.

As examples of the straight-chain aliphatic diprimary diamines having 6–12 carbon atoms are to be used according to the invention, 1,6-diaminohexane; 1,9-diaminononane; and 1,12-diaminododecane can be mentioned.

The amount of caprolactam and/or ε-aminocaproic acid to be employed per mole of carboxyl groups of the acid used, as well as the (lactam+ε-aminocaproic acid)/(lactone+ε-hydroxy caproic acid) ratio, is chosen depending on the value of the desired melting point. Thus, when the polyamide melt adhesives are employed as textile adhesives, the amount of lactam per mole of carboxyl groups of the polymerized fatty acids and of the co-dicarboxylic acid or acids is from 0.5 to 1.5 mole, and when the polyesteramide melt adhesives are employed as textile adhesives, the amount of lactam and/or ε-aminocaproic acid per mole of carboxy groups of the polymerized fatty acid and of the co-dicarboxylic acid or acids is from 0.5 to 2.5 mole and the amount of lactone and/or ε-hydroxycaproic acid is from 0.05 to 1.0 mole per mole of lactam and/or ε-aminocaproic acid. The materials to be adhered together are textiles, including siliconized fabrics.

The polyamides to be used according to the present invention are prepared by condensation of the dimerized fatty acid (component a) or of its amide-forming derivatives with the caprolactam and/or the ε-aminocaproic acid in a first stage. In this case, a low temperature (i.e. about 150° C.) is initially used so that the reaction can be easily directed. For concluding the reaction, the temperature is then raised to the required value. The relationships between the amounts of the reagents employed in this first stage vary according to the desired degree of condensation of aminocaproic acid or of caprolactam.

In a second stage, this reaction product is combined with the required further components and the reaction is carried out to a conclusion in the manner conventional for the preparation of amides.

To facilitate carrying out the reaction, solvents or diluents can be employed.

The polyesteramides of the invention can be prepared by a melt condensation of substantially equivalent amounts of the aforementioned reaction partners at temperatures between 200° C. and 290° C., particularly at 250° C., under an inert gas. In the last phase of the reaction, a vacuum is applied for achieving a faultless product.

The polyesteramide can optionally also be prepared, like the polyamide, in a two-stage process in which, in the first stage, the dimerized fatty acid (component a) or its amide-forming derivatives is condensed with all or part of the caprolactam and/or of the ε-aminocaproic acid, and the reaction with the further components follows in a second stage.

The melt viscosity of the polyamides and polyesteramides of the present invention should generally lie between 25 and 600 Pa·s, measured at 220° C.

A better understanding of the present invention and of its many advantages will be had by referring to the following specific examples, given by way of illustration. For the examples, the following conditions pertain.

Determination of the Softening Point

The determination of this value is carried out on a Kofler bench in the following manner:

The finely-ground polyamide powder having a grain size between 0.3 mm and 0.5 mm was strewn on the Koffler bench. Then, a sheet of paper was pressed onto the sample in the softening region and, after 90 seconds, was slowly pulled towards the colder side of the Kofler bench. At a certain temperature limit, polyamide threads form between the Kofler bench and the pulled paper. This temperature limit is equated to the softening point.

Preparation of Adhesive Bonds

Strips of a fabric of a polyester/wool mixture (55%/45%) 5 cm in breadth were adhered. The polyamide powder had a grain size of 300–500 microns. The amount employed was 20 g/m² of material.

The coated strips of material were adhered at temperatures about 20° C. to 30° C. above the softening point of the polyamide adhesive with a second, uncoated fabric strip. The adhesion time was about 15 to 20 seconds and the adhesion pressure was 400 g/cm².

Washing and Cleaning Processes

A 3 percent bath of a commercial machine washing agent was used for washing at temperatures of 60° C. and 95° C. The washing cycle at 60° C. lasted 45 minutes; at 95° C., it lasted 90 minutes. The wash programs included a rinse cycle and a spin cycle.

The wet fabric samples were tested at room temperature for their resistance to separation according to DIN 53274. The width of the text sample was 5 cm. Perchloroethylene was used for dry cleaning at room temperature for 30 minutes. The cleaned fabric samples were again measured when wet.

In preparing the polyamides reported in the Tables, the following polymerized fatty acids were used: Examples 1, 4, 6, 7, 9, 10, 12, 14 employed a dimerized tall oil fatty acid of the following composition:
monomeric fatty acid 3.6 percent by weight
dimeric fatty acid 94.2 percent by weight
trimeric fatty acid 2.2 percent by weight;
Examples 2, 3, 8, 11, 13, 15 used a dimerized oleic acid of the following composition:
monomeric fatty acid 5.3 percent by weight
dimeric fatty acid 93.3 percent by weight
trimeric fatty acid 1.4 percent by weight;
Example 5 employs dimerized soya oil fatty acid of the following composition:
monomeric fatty acid 11.2 percent by weight
dimeric fatty acid 76.3 percent by weight
trimeric fatty acid 12.5 percent by weight.

EXAMPLE 1

22.23 kg of dimerized tall oil fatty acid and 14.81 kg of tall oil fatty acid were heated with 146.90 kg of caprolactam under nitrogen at 250° C. in a reactor equipped with a stirrer, a descending condenser, and thermometer, and were kept for 4 hours at this temperature. The acid so obtained was combined with 131.40 kg of sebacic acid and 143.00 kg of 1,12-diaminododecane and condensation was completed in 4 hours at 250° C. During the last 2 hours, a vacuum of 2 mm Hg was applied.

The polyamide obtained had the following values:
Softening point: 131° C.
Melt viscosity (220° C.): 154.0 Pa·s
Resistance to separation: (kg/5 cm): 3.5 (washed at 60° C. and torn wet)
Resistance to separation after cleaning with perchloroethylene (kg/5 cm): 4.1 (torn wet); Initial value (kg/5 cm): 5.7.

The polyamides of Examples 2–5 reported in the following Tables were prepared in similar fashion.

TABLE I

| Example | Composition (g) | Ratio of carboxy groups of fatty acids (a): carboxy groups of co-dicarboxylic acid (b) | Moles of caprolactam per mole of carboxy groups |
|---|---|---|---|
| 2 | 171.46 dimerized oleic acid<br>10.94 soya oil fatty acid<br>23.37 adipic acid<br>30.32 azelaic acid<br>74.43 1,6-diaminohexane<br>144.64 g caprolactam | 1.0 : 1.0 | 1.0 |
| 3 | 139.50 dimerized tall oil fatty acid<br>2.85 tall oil fatty acid<br>136.00 dimethylbrassylate<br>87.71 hexamethylendiamine<br>113.08 caprolactam | 0.5 : 1.0 | 0.67 |
| 4 | 228.00 dimerized tall oil fatty acid<br>20.22 sebacic acid<br>58.17 hexamethylendiamine<br>146.19 caprolactam | 4.0 : 1.0 | 1.3 |
| 5 | 78.75 dimerized tall oil fatty acid<br>7.78 tall oil fatty acid<br>61.38 sebacic acid<br>52.94 hexamethylendiamine<br>102.96 caprolactam | 0.5 : 1.0 | 1.0 |

TABLE II

| | | | Resistance to separation (kg/5cm) | | |
|---|---|---|---|---|---|
| Example | Softening point (° C.) | Melt viscosity (Pa.s at 220° C.) | Initial value | Washed at 60° C., torn wet | Perchloroethylene dry cleaning, torn wet |
| 2 | 122 | 48.0 | 5.1 | 3.0 | 3.2 |
| 3 | 128 | 231.5 | 5.3 | 3.5 | 3.3 |
| 4 | 112 | 191.0 | 5.8 | 3.7 | 2.6 |

TABLE II-continued

| Example | Softening point (° C.) | Melt viscosity (Pa.s at 220° C.) | Resistance to separation (kg/5cm) | | |
|---|---|---|---|---|---|
| | | | Initial value | Washed at 60° C., torn wet | Perchloroethylene dry cleaning, torn wet |
| 5 | 103 | 527.0 | 7.7 | 3.5 | 4.5 |

EXAMPLE 6

27.02 g of dimerized tall oil fatty acid, 18.00 g of tall oil fatty acid, 57.70 g of adipic acid, 79.85 g of sebacic acid [ratio of the carboxyl groups according to (a) (1) and (2) to co-dicarboxylic acid according to (b)=0.1:1], 101.05 g of 1,6-diaminohexane, 178.54 g of caprolactam [0.9 mole of caprolactam per mole of carboxyl groups from (a) and (b)], as well as 181.01 g of caprolactone (mole ratio of caprolactam:caprolactone=1:0.1) were weighed into a reactor provided with a descending condenser, stirrer, and thermometer, and were heated to 250° C. under nitrogen during the course of 2 hours and then were held for 7 hours at this temperature.

During the last 4 hours, a vacuum of 2 mm Hg was applied.

The polyesteramide obtained had the following values:
Softening point: 123° C.
Melt viscosity (220° C.): 57.1 Pa·s
Resistance to separation (kg/5 cm): 2.9 (washed at 60° C., torn wet)
Resistance to separation (kg/5 cm): 5.1 (dry cleaning in perchloroethylene, torn wet)
Initial Value (kg/5 cm): 5.8

The polyester amides of Examples 7-10 reported in the following Tables were prepared in the same way.

TABLE III

| Example | Composition (g) | | Ratio of carboxy groups of fatty acids (a) : carboxy groups of co-dicarboxylic acid (b) | Moles of caprolactam per mole of carboxy groups | Mole ratio caprolactam: caprolactone |
|---|---|---|---|---|---|
| 7 | 128.47 | dimerized tall oil fatty acid | 0.5 : 1.0 | 0.5 | 1 : 1 |
| | 2.62 | stearic acid | | | |
| | 92.99 | sebacic acid | | | |
| | 80.24 | 1,6-diaminohexane | | | |
| | 77.97 | caprolactam | | | |
| | 78.76 | caprolactone | | | |
| 8 | 214.10 | dimerized tall oil fatty acid | 4.0 : 1.0 | 1.5 | 1 : 0.066 |
| | 2.5 | stearic acid | | | |
| | 19.20 | sebacic acid | | | |
| | 55.24 | 1,6-diaminohexane | | | |
| | 161.03 | caprolactam | | | |
| | 10.83 | caprolactone | | | |
| 9 | 184.34 | dimerized tall oil fatty acid | 1.0 : 1.0 | 1.0 | 1 : 0.5 |
| | 3.76 | stearic acid | | | |
| | 62.53 | azelaic acid | | | |
| | 76.73 | 1,6-diaminohexane | | | |
| | 149.16 | caprolactam | | | |
| | 75.24 | caprolactone | | | |
| 10* | 205.2 | dimerized tall oil fatty acid | 2.0 : 1.0 | 1.0 | 1 : 0.17 |
| | 36.38 | sebacic acid | | | |
| | 122.04 | caprolactam | | | |
| | 20.52 | caprolactone | | | |
| | 62.78 | 1,6-diaminohexane | | | |

*dimerized tall oil fatty acid precondensed with caprolactam

TABLE IV

| Example | Softening point (° C.) | Melt viscosity (Pa.s at 220° C.) | Resistance to separation (kg/5cm) | | |
|---|---|---|---|---|---|
| | | | Initial value | Washed at 60° C., torn wet | Perchloroethylene dry cleaning, torn wet |
| 7 | 118 | 52.4 | 5.0 | 3.0 | 2.8 |
| 8 | 104 | 141.0 | 5.1 | 3.5 | 2.8 |
| 9 | 115 | 96.6 | 5.8 | 2.7 | 3.2 |
| 10 | 110 | 94.5 | 5.4 | 2.9 | 2.9 |

EXAMPLE 11

55.77 g of dimerized tall oil fatty acid, 9.83 g of stearic acid, 92.99 g of sebacic acid [ratio of the carboxy groups of the fatty acid mixture according to (a) (1) and (2) to co-dicarboxylic acid according to (b)=0.25:1.0], 66.86 g of 1,6-diaminohexane, 207.92 g of caprolactam [1.6 mole of caprolactam per mole of carboxyl groups according to (a) and (b)], as well as 26.22 g of caprolactone (mole ratio of caprolactam:caprolactone=1.0:0.125) were weighed into a reactor provided with a descending condenser, stirrer, and thermometer and were heated to 250° C. under nitrogen over a period of 2 hours and held at this temperature for 7 hours. During the last 4 hours, a vacuum of 2 mm Hg was applied.

The polyesteramide had the following values:
Softening point: 120° C.
Melt viscosity (220° C.): 58.0 Pa·s
Resistance to separation (kg/5 cm): 3.5 (washed at 60° C., torn wet)
Resistance to separation (kg/5 cm): 4.5 (dry cleaning in perchloroethylene, torn wet)
Initial Value (kg/5 cm): 6.1.

The polyesteramides of Examples 12-15 reported in the following Tables were prepared in the same manner.

TABLE V

| Example | Composition (g) | | Ratio of carboxy groups of fatty acids (a) : carboxy groups of co-dicarboxylic acid (b) | Moles of caprolactam per mole of carboxy groups | Mole ratio caprolactam : caprolactone |
|---|---|---|---|---|---|
| 12 | 94.39 | dimerized tall oil fatty acid | 0.5 : 1.0 | 1.66 | 1 : 0.1 |
| | 8.20 | stearic acid | | | |
| | 72.77 | sebacic acid | | | |
| | 62.79 | 1,6-diaminohexane | | | |
| | 203.40 | caprolactam | | | |
| | 20.52 | caprolactone | | | |
| 13 | 129.67 | dimerized tall oil fatty acid | 1.0 : 1.0 | 1.75 | 1 : 0.07 |
| | 12.82 | stearic acid | | | |
| | 50.54 | sebacic acid | | | |
| | 58.15 | 1,6-diaminohexane | | | |
| | 197.75 | caprolactam | | | |
| | 14.25 | caprolactone | | | |
| 14 | 184.34 | dimerized tall oil fatty acid | 3.0 : 1.0 | 2.125 | 1 : 0.059 |
| | 3.76 | stearic acid | | | |
| | 22.23 | azelaic acid | | | |
| | 51.17 | 1,6-diaminohexane | | | |
| | 211.31 | caprolactam | | | |
| | 12.45 | caprolactone | | | |
| 15* | 188.10 | dimerized tall oil fatty acid | 3.0 : 1 | 2.0 | 1 : 0.125 |
| | 22.23 | sebacic acid | | | |
| | 198.88 | caprolactam | | | |
| | 25.08 | caprolactone | | | |
| | 51.15 | 1,6-diaminohexane | | | |

*dimerized tall oil fatty acid precondensed with caprolactam

TABLE VI

| Example | Softening point (° C.) | Melt viscosity (Pa·s at 220° C.) | Resistance to separation (kg/5cm) | | |
|---|---|---|---|---|---|
| | | | Initial value | Washed at 60° C., torn wet | Perchloroethylene dry cleaning, torn wet |
| 12 | 124 | 98.5 | 6.2 | 3.4 | 5.0 |
| 13 | 129 | 72.2 | 6.1 | 3.4 | 5.5 |
| 14 | 138 | 112.0 | 5.7 | 3.2 | 4.6 |
| 15 | 128 | 152.0 | 5.0 | 2.8 | 3.0 |

What is claimed is:

1. A polyamide having a melt viscosity from 25 to 600 Pa·s at 220° C. and adaptable to use as a melt adhesive for textiles, said polyamide being the condensation product of:
   (a) A dimerized fatty acid having a dimeric fatty acid content from 70 to 100 percent by weight and wherein from 0 to 50 equivalent percent of the total carboxy groups therein may derive from monocarboxylic acids present in said dimerized fatty acid or added thereto as a viscosity regulator;
   (b) an amount of an aliphatic straight-chain co-dicarboxylic acid having from 6 to 13 carbon atoms such that the ratio of carboxy groups in component (a) to those in component (b) is from 0.05:1 to 5:1;
   (c) an amount of an aliphatic straight-chain diprimary diamine having from 6 to 12 carbon atoms which is substantially equivalent to the acid components (a) and (b); and
   (d) from 0.5 to 1.5 moles, per mole of carboxy groups present in acid components (a) and (b), of a member selected from the group consisting of caprolactam and ε-aminocaproic acid;
said polyamide being prepared by reacting component (a) with all or part of component (d) in a first step and then reacting the product of this first reaction with the remaining components in a second step.

2. A polyesteramide having a viscosity from 25 to 600 Pa·s at 220° C. and adaptable to use as a melt adhesive for textiles, said polyesteramide being the condensation product of:
   (a) A dimerized fatty acid having a dimeric fatty acid content from 70 to 100 percent by weight and wherein from 0 to 50 equivalent percent of the total carboxy groups therein may derive from monocarboxylic acids present in said dimerized fatty acid or added thereto as a viscosity regulator;
   (b) an amount of an aliphatic straight-chain co-dicarboxylic acid having from 6 to 13 carbon atoms such that the ratio of carboxy groups in component (a) to those in component (b) is from 0.05:1 to 5:1;
   (c) an amount of an aliphatic straight-chain diprimary diamine having from 6 to 12 carbon atoms which is substantially equivalent to the acid components (a) and (b);

(d) from 0.5 to 2.5 moles, per mole of carboxy groups present in acid components (a) and (b), of a member selected from the group consisting of caprolactam and ε-aminocaproic acid; and (e) from 0.05 to 1.0 mole, per mole of component (d), of a member selected from the group consisting of caprolactone and ε-hydroxycaproic acid.

3. A polyesteramide as in claim 2 which is prepared by reacting component (a) with all or part of component (d) in a first step and then reacting the product of this first reaction with the remaining components in a second step.

4. In the method of adhering textiles with a melt adhesive, the improvement wherein said melt adhesive is a polyamide as in claim 1.

5. In the method of adhering textiles with a melt adhesive, the improvement wherein said melt adhesive is a polyesteramide as in claim 2.

6. In the method of adhering textiles with a melt adhesive, the improvement wherein said melt adhesive is a polyesteramide as in claim 3.

* * * * *